H. P. Brooks,
Bread Toaster.
No. 106,462. Patented Aug. 16, 1870.
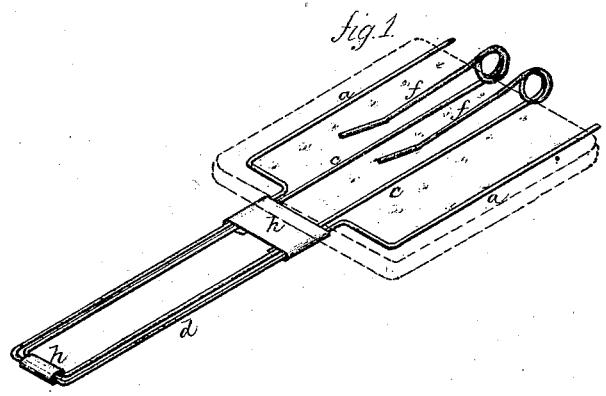
Witnesses:
J. H. Shumway
A. J. Tibbits
Heman P. Brooks.
Inventor
By his Attorney
John E. Earle

United States Patent Office.

HEMAN P. BROOKS, OF WATERBURY, CONNECTICUT.

Letters Patent No. 106,462, dated August 16, 1870.

BREAD-TOASTER.

The Schedule referred to in these Letters Patent and making part of the same.

To all whom it may concern:

Be it known that I, HEMAN P. BROOKS, of Waterbury, in the county of New Haven and State of Connecticut, have invented a new Improvement in Bread-Toaster; and I do hereby declare the following, when taken in connection with the accompanying drawings and the letters of reference marked thereon, to be a full, clear, and exact description of the same, and which said drawings constitute part of this specification, and represent in—

Figure 1, a perspective view, and in

Figure 2, a side view.

This invention relates to an improvement in device for holding bread to be toasted, the object being to dispense with the usual folding or hinged apparatus, and consequently cheapen the construction and lessen the mechanical part of the operation required in the toaster; and The invention consists in the construction of a toaster from wire formed into prongs, or fork-shape, one or more of which prongs are bent or coiled over, to bear upon the reverse side of the bread, to hold the bread.

$a\ a$ are two prongs, formed from wire, which are bent, so as to form parts of a handle, $d$.

$c\ c$ are two other prongs, for convenience of construction, also forming part of the handle, and at a length equal, or nearly so, to the prongs $a\ a$.

The prongs $c$ are bent or coiled over, returning, to form the springs $f$, as seen in figs. 1 and 2.

The bread to be toasted is placed upon the prongs and passed under the springs $f$, as seen in fig. 2.

Either or all of the prongs may be thus returned, it being only necessary that a sufficient number be retained to support the bread.

The parts are united by metal bands $h$, which clasp the several wires of which the toaster is formed.

I claim as my invention—

The herein-described toaster, consisting of the handle D, prongs $a$ and $c$, one or more of which are bent in the manner described, so as to form springs or reverse bearings $f$, substantially in the manner described.

HEMAN P. BROOKS.

Witnesses:
FRANKLIN L. WELTON,
CHAS. W. GILLETTE.